June 28, 1955
K. J. AVERSTEN
2,711,798
METAL STUD OR PIN FOR SOLDERING PURPOSES
AND METHOD OF MANUFACTURE
Filed March 13, 1950
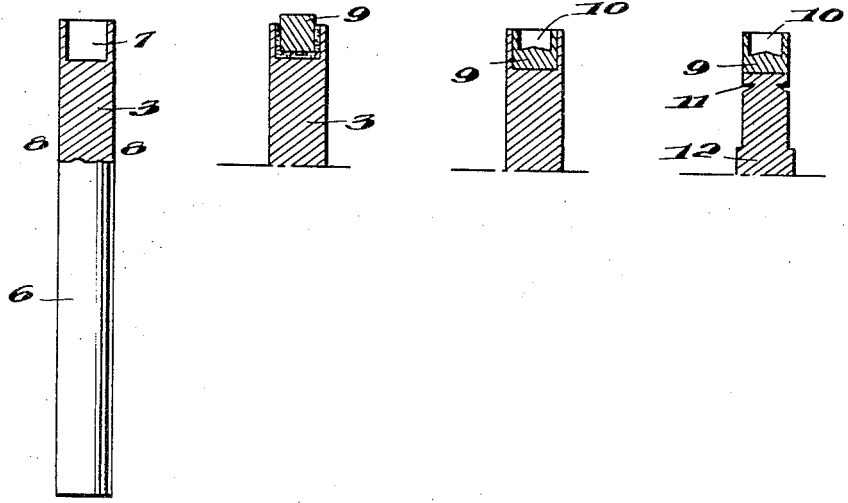
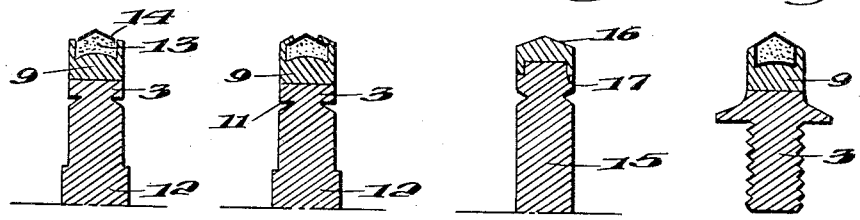
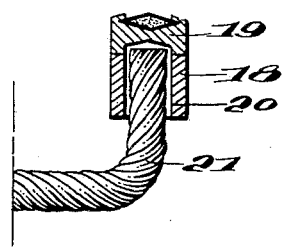
INVENTOR
KARL J. AVERSTEN,
BY Larson and Whiting
ATTORNEYS

United States Patent Office 2,711,798
Patented June 28, 1955

2,711,798

METAL STUD OR PIN FOR SOLDERING PURPOSES AND METHOD OF MANUFACTURE

Karl J. Aversten, Lidingo, Sweden, assignor to Svenska Aktiebolaget Gasaccumulator, Lidingo, near Stockholm, Sweden Application March 13, 1950, Serial No. 149,435

Claims priority, application Sweden November 4, 1949

8 Claims. (Cl. 287—20.2)

The present invention refers to a metal stud or pin adapted to be attached to a metallic member by the application of electric current to the pin for a short interval of time whereby the pin is partially melted and is attached to the member when solidified.

The chief object of the invention is to provide a stud or pin adapted to be attached by soldering to a metallic member.

Additional objects of the invention are to provide suitable methods of manufacturing pins of the kind referred to and, further, to ensure rapid and reliable attaching of such pins.

To this end, the pin according to this invention comprises two portions of different material, such as metals, abutting each other in the axial direction of the pin. The material of the two portions have melting points, which differ to such an extent as to enable melting of one of the portions by the application of electric current through the pin without melting of the other portion. The method of manufacture as well as other features of novelty characterizing the invention will be apparent from the following description and annexed drawings, in which:

Figs. 1-6 are longitudinal sections through a metal pin according to the invention in different stages of manufacture.

Fig. 7 is a longitudinal section through a metal pin according to a modified form of the invention, Fig. 8 is a partially sectional view of a modified form of pin, and Fig. 9 is a section through a further modified form of the pin.

When manufacturing a pin 3 according to the invention, as shown in Figs. 1-6, one may start from a rod-shaped blank 6 of metallic material such as brittle brass, in which a terminal recess 7 is formed, whereupon a suitable length is cut off at line 8 shown in Fig. 1.

Some solder paste or the like is inserted in recess 7 and a piece of solder 9, such as weld bronze or silver solder or the like, as shown in Fig. 2, is then put into the recess. The blank is then brought into an oven and heated to such an extent as to make solder piece 9 attach itself by melting in recess 7.

The blank is then mounted in a turret lathe and a second terminal recess 10 formed in the solder piece, as shown in Fig. 3. The blank is then cut laterally so as to remove the walls of recess 7 and baring solder piece 9 along the entire axial length thereof, as shown in Fig. 4. A sharp notch 11 is then cut in the blank between the pin proper 3 and its extension 12.

When the blank has been removed from the lathe recess 10 in solder piece 9 is filled with a flux 13 and is then covered with a conical lid 14 of the same material as that making up the piece of solder, as indicated in Fig. 5. The rims of the wall of recess 10 are bent down onto lid 14 so as to keep the lid in place, as shown in Fig. 6, and the pin is then ready for being attached by soldering to a metallic member. Extension 12 is inserted in the holder of a welding gun and the attaching of the pin 3 is brought about by the application of an electric current, through which an arc is formed. Hereby lid 14 is melted so that flux 13 flows out. Solder piece 9 is then also melted and after the subsequent solidifying of the solder the pin 3 will have been attached by the soldering process. Extension 12 may then be knocked away at notch 11.

As shown in Fig. 7, the metal pin 15 has been provided with solder metal 16 through the application of pressure. For instance, a piece of solder metal may have been pressed by pin 15 through an aperture in a die in such a way as to make the solder be pressed around the end of pin 15 in collar fashion and into a notch 17 in the pin. Solder metal 16 may remain in the solid state or may be provided with a recess accommodating a flux. The application of the solder may also be done by spraying it on to the pin in a spraying process. For this purpose it is suitable to place a great number of pins side by side.

The metal pins shown in Figs. 1-7 are particularly suitable for being inserted in an aperture in one of two adjacent metal members so that, when the solder is melted, the pin is not only attached to the other member but also to the aperture and is attached in it through the soldering process. However, the pin may also be threaded, as shown in Fig. 8, and it may then be soldered to one of the metal members, whereupon the other member may be threaded onto the pin.

In the embodiment shown in Fig. 9 the pin 18 is not provided with threads but instead thereof an axial bore 20 penetrates the entire length of the pin so that when a cable or wire 21 is inserted in the bore it may reach up to solder metal 19. Part 19 is provided with a recessed top for the reception of a flux in a manner similar to that shown in Fig. 6. When the solder is melted some of it penetrates into bore 20, whereby a solder connection is obtained firstly between a metal member to which the pin and cable are to be secured and pin 18 and secondly between the latter and cable 21. In this way a very strong and dependable connection is obtained. In all of the embodiments shown the pin comprises a main metal part and an end or terminal contact part. The main metal part is the stud or pin to be secured to the metallic surface and the end or terminal contact part comprises the solder which is disposed on the end of the pin. It is important that portions of the main metal part do not extend outwardly towards the end of the terminal contact part beyond the peripheral line of juncture between the main metal part and the end or terminal contact part. Any such projecting portion of the main metal part would tend to be fused by the electric arc which is not desirable in the use of the soldering pins herein disclosed.

The flux referred to above may comprise the well-known ingredient sodium tetraborate in combination with sodium or potassium acid chloride or fluoride. The combination may also include potassium boron fluoride.

When in the claims mention is made of soldering and solder, reference is made to a process and a material for connecting two metallic members with the aid of an interposed melted metal or metal alloy such as weld bronze or silver solder or the like. The solder has a lower melting point than either of the metallic members and the process is effected without melting either of the metallic members and without oxidizing or vaporizing the melted metal or metal alloy.

It will be apparent to those skilled in the art that the invention is capable of a variety of embodiments besides the ones shown and described. Therefore, any such embodiment that comes within the spirit and scope of the invention, as defined in the appended claims, is to be considered as protected thereby.

What is claimed is:

1. A method of manufacturing a stud for soldering purposes, having a pair of portions of different melting points soldered together in coaxially abutting relation, comprising the steps of forming a terminal recess in the one of said portions having the higher melting point, inserting an end of the other of said portions in said recess and attaching said end by soldering therein, forming a second recess in the free end of said other portion, inserting a flux in said second recess, and closing said second recess.

2. A method of manufacturing a stud, comprising the steps of forming an end recess in a blank, inserting metal of lower melting point than said blank into the said recess to form an end contact part, effecting union by soldering, and removing the wall of the recess in the blank.

3. A method of manufacturing a stud, comprising the steps of applying an end contact metal part on a main metal part of higher melting point than said end contact metal part by pressing the end contact part around the outer periphery of said main metal part, arranging a recess in said end contact part and filling said recess with a non-metallic weld refining flux.

4. A soldering stud for connection to a metallic surface by the use of electric arc techniques comprising a main part and a terminal contact part joined thereto, portions of the main part adjacent the peripheral line of juncture between the main and terminal contact parts constituting the nearest exposed portions of the main part to the outer end of the terminal contact part, the terminal contact part being of solder and having a melting point lower than that of the main part so as to melt in an electric arc to form the connection of the main part with the metallic member without melting of the main part or the metallic surface.

5. A stud according to claim 4 wherein the end contact part comprises welding bronze.

6. A stud according to claim 4 wherein the end contact part comprises silver solder.

7. A soldering stud for connection to a metallic surface by the use of electric arc apparatus comprising a main part and an end contact part joined thereto, the end contact part completely covering one end face of the main part, the end contact part being of solder and having a melting point lower than that of the main part so as to melt in an electric arc to form the connection of the main part with the metallic member without melting of the main part.

8. A soldering stud for connection to a metallic surface by the use of electric arc apparatus comprising a main part and an end contact part joined thereto, the end contact part completely covering one end face of the main part and having a recess therein, said recess being filled with flux, the end contact part being of solder and having a melting point lower than that of the main part so as to melt in an electric arc to form the connection of the main part with the metallic member without melting of the main part.

References Cited in the file of this patent

UNITED STATES PATENTS

| Number | Name | Date |
|---|---|---|
| 762,840 | Osborn | June 14, 1904 |
| 1,066,468 | Chubb | July 8, 1913 |
| 1,200,810 | Clemens | Oct. 10, 1916 |
| 1,462,775 | Trivelloni | July 24, 1923 |
| 1,755,210 | Dohner | Apr. 22, 1930 |
| 2,094,495 | Robinson et al. | Sept. 28, 1937 |
| 2,263,166 | Darvie et al. | Nov. 18, 1941 |
| 2,268,416 | Nelson | Dec. 30, 1941 |
| 2,333,622 | McNab | Nov. 2, 1943 |
| 2,402,659 | Nelson | June 25, 1946 |
| 2,441,257 | Candy | May 11, 1948 |
| 2,502,399 | Greff | Mar. 28, 1950 |
| 2,509,999 | Van der Willigen et al. | May 30, 1950 |
| 2,535,397 | Duch et al. | Dec. 26, 1950 |
| 2,612,394 | Nelson | Sept. 30, 1952 |
| 2,638,525 | Candy | May 12, 1953 |

FOREIGN PATENTS

| Number | Country | Date |
|---|---|---|
| 284,340 | Great Britain | Jan. 27, 1928 |